(12) United States Patent
Ebert et al.

(10) Patent No.: US 12,287,003 B2
(45) Date of Patent: Apr. 29, 2025

(54) DRIVE SYSTEM

(71) Applicant: Physik Instrumente (PI) GmbH & Co. KG, Karlsruhe (DE)

(72) Inventors: Michael Ebert, Karlsruhe (DE); Christian Rudolf, Karlsbad (DE); Christian Sander, Karlsruhe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 0 days.

(21) Appl. No.: 17/769,520

(22) PCT Filed: Oct. 19, 2020

(86) PCT No.: PCT/EP2020/079357
§ 371 (c)(1),
(2) Date: Apr. 15, 2022

(87) PCT Pub. No.: WO2021/074447
PCT Pub. Date: Apr. 22, 2021

(65) Prior Publication Data
US 2024/0151275 A1    May 9, 2024

(30) Foreign Application Priority Data

Oct. 18, 2019  (DE) ..................... 10 2019 216 106.5

(51) Int. Cl.
*F16H 21/12* (2006.01)
*F16C 3/18* (2006.01)
*F16C 3/28* (2006.01)

(52) U.S. Cl.
CPC .................. *F16C 3/18* (2013.01); *F16C 3/28* (2013.01); *F16H 21/12* (2013.01); *Y10T 74/18392* (2015.01)

(58) Field of Classification Search
CPC ........ F16C 3/18; F16C 3/28; Y10T 74/18392; F16H 21/12
(Continued)

(56) References Cited

U.S. PATENT DOCUMENTS 229,875 A * 7/1880 Dixon ..................... A01C 19/00
74/67
1,596,332 A   8/1926 Owen et al.
(Continued)

FOREIGN PATENT DOCUMENTS

CN    107636951 A     1/2018
DE    102007035309 A1  2/2008
(Continued)

OTHER PUBLICATIONS

Office Action (Notice of Grounds of Rejection) issued on Aug. 1, 2023, by the Japanese Patent Office in corresponding Japanese Patent Application No. 2022-522940, and an English Translation of the Office Action. (9 pages).
(Continued)

*Primary Examiner* — Greg Binda
(74) *Attorney, Agent, or Firm* — Buchanan Ingersoll & Rooney, PC

(57) ABSTRACT

A drive system as disclosed includes an input shaft, an output shaft, and at least two coupling elements respectively coupled to the input shaft and the output shaft. In order to absorb assembly and manufacturing tolerances with respect to the shafts, the coupling elements and their attachment to the shafts and thereby prevent jamming of the drive system, at least one coupling element has an elastically deformable section, the elastically deformable section having a different material or a different cross-section than an adjacent section of the coupling element.

15 Claims, 3 Drawing Sheets

(58) Field of Classification Search
USPC .................. 74/67; 464/92; 180/8.6; 901/1
See application file for complete search history.

(56) References Cited

U.S. PATENT DOCUMENTS

| | | | |
|---|---|---|---|
| 1,790,516 A * | 1/1931 | Williams | ................. F16D 3/74 |
| | | | 464/92 |
| 8,925,406 B1 | 1/2015 | Borovskikh | |
| 2003/0221892 A1 | 12/2003 | Matsumoto et al. | |
| 2013/0098182 A1 | 4/2013 | Borovskikh | |
| 2018/0131292 A1 | 5/2018 | Hübner et al. | |

FOREIGN PATENT DOCUMENTS

| | | |
|---|---|---|
| EP | 0021452 A1 | 1/1981 |
| FR | 574624 A | 7/1924 |
| GB | 290686 A | 5/1928 |
| JP | S5056280 U | 5/1975 |
| JP | 2017089782 A | 5/2017 |
| RU | 2426021 C1 | 8/2011 |
| TW | 200306931 A | 12/2003 |
| WO | 2004010043 A1 | 1/2004 |
| WO | 2009123551 A1 | 10/2009 |

OTHER PUBLICATIONS

International Search Report (PCT/ISA/210) and Written Opinion (PCT/ISA/237) mailed on Feb. 5, 2021, by the European Patent Office as the International Searching Authority for International Application No. PCT/EP2020/079357. (12 pages).

Search Report dated Jun. 23, 2020 issued by the German Patent and Trademark Office in corresponding German Patent Application No. 10 2019 216 106.5. (10 pages).

Notification of the First Office Action issued on Mar. 4, 2024, by the Chinese Patent Office in corresponding Chinese Patent Application No. 202080072757.5, and an English Translation of the Office Action. (17 pages).

* cited by examiner

DRIVE SYSTEM

The present invention relates to a drive system.

Due to installation space requirements and mounting reasons, as well as to reduce thermal influences, an energy converter (e.g. motor) may be arranged locally separated from an actuator axis. However, this requirement necessitates energy transmission from an input to an output side.

From the prior art there is known the transmission of torque from an input shaft to an output shaft arranged parallel thereto by means of coupling elements (e.g. connecting rods). In this respect, for example, the drive systems disclosed in DE 10 2007 035 309 A1, WO 2009/123551 A1 and U.S. Pat. No. 8,925,406 B1 provide for more than one coupling element between the input shaft and the output shaft.

Such drives, however, tend to jam due to assembly and manufacturing tolerances of the shafts as well as the coupling elements and their attachment to the shafts. Therefore, it is the object of the present invention to provide a drive system having an input shaft and an output shaft and at least two coupling elements connected therebetween, in which jamming is prevented.

To address this object, the present invention provides the drive system according, comprising: an input shaft, an output shaft, at least two coupling elements respectively coupled to the input shaft and the output shaft, wherein at least one coupling element has an elastically deformable section, and the elastically deformable section has a different material or cross-section than an adjacent section of the coupling element.

Due to the elastically deformable section of the coupling element, there is a flexible distance between the two connecting sections of the coupling element through which the coupling element is connected to the shafts. Since at least one coupling element has the elastically deformable section, deviations in the alignment of the shaft axes and differences in the lengths of the coupling elements may be compensated for by elastic deformation of the elastically deformable section during operation. With this configuration, a backlash-free and precise transmission of the torque may nevertheless be ensured. Furthermore, the drive system according to the invention is also suitable for use in the low-temperature range (up to cryogenic temperatures) and in ultra-high vacuum. Due to a parallel-mounted motor, the drive system remains compact. Furthermore, the components of the drive system according to the invention compare favorably with gears or friction wheels, which must be precisely manufactured and require accurate adjustment of the shaft axes.

Preferred embodiments are the subject-matter of the dependant claims.

It may be advantageous if the elastically deformable section is configured in such a way that, due to elastic deformation of the elastically deformable section, at least part of the drive power is absorbed during operation and the efficiency of the drive system is in the range between 50 and 100%, preferably in the range between 90 and 95%, preferably in the range between 95 and 99%, and/or the torque variation between the input shaft and the output shaft is in the range between 0 and 50%, preferably in the range between 1 and 25%, preferably in the range between 1 and 10%. Drive systems according to the invention that have high efficiency and low torque variation preferably meet requirements for a continuously and comparatively fast rotating output shaft, whereas a drive system with comparatively low efficiency and high torque variation may be used in positioning systems, in which the output shaft usually performs only fractions of a revolution.

It may be useful if the elastically deformable section is located exactly or substantially centrally between the input shaft and the output shaft. Due to the symmetrical arrangement of the elastically deformable section, the elasticity or flexibility of the coupling element may act uniformly in both directions along the longitudinal extent of the coupling element.

It may be advantageous if the elastically deformable section includes an elastic element, preferably in the form of a spring or an elastomer. By appropriate selection of the elastic element the elasticity of the elastically deformable section may be selectively adjusted.

According to the invention, the elastically deformable section has a different material or a different cross-section than an adjacent section of the coupling element. As a result, the elastically deformable section may be integrated into the coupling element with a material bond and/or the entire coupling element may be formed in one piece.

It may be advantageous if both the input shaft and output shaft have one or more eccentric sections, and each coupling element is coupled to the corresponding eccentric section. A simple and reliable connection of the coupling element may be achieved via the eccentric section, by, for example, a connecting section at the end of the coupling element that receives the eccentric section.

It may also be beneficial if each coupling element is coupled to an end face of the input shaft and/or an end face of the output shaft. This may allow free access to the input shaft or output shaft along its axis of rotation.

It may be useful if the coupling elements are arranged on the input shaft and the output shaft such that they are preferably 60° or 90° out of phase with each other. This arrangement may provide a more constant or uniform torque transmission between the input shaft and the output shaft, while avoiding a singularity in the motion space.

It may prove useful if the input shaft and the output shaft are elastically mounted, preferably in a common housing, particularly preferably in an elastically deformable housing. This may further reduce the risk of jamming of the drive system.

It may be advantageous if the output shaft has a longitudinal slot extending along the axis of rotation. The longitudinal slot may accommodate an optical fiber.

It may be advantageous if the output shaft has a clamping device in the region of the longitudinal slot to clamp an optical fiber arranged in the longitudinal slot. This allows the optical fiber to be positioned and fixed on the axis of rotation of the output shaft.

It may be useful if one or both of the coupling elements is/are U-shaped. The specific motion space of the U-shaped coupling elements may result in a free space in the vicinity of the shafts that may be used, for example, for positioning the optical fiber.

It may be convenient if the output shaft is adjustable by a rotation angle of +/−135° about the rotation axis. This may provide a positioning system whose use case requires such a range of rotation angles.

Another aspect of the invention relates to a hexapod including a plurality of legs and at least one drive system according to any of the preceding embodiments, wherein the output shaft of one of the drive systems is connected to one of the legs of the hexapod for movement thereof by actuation of the drive system.

Terms and Definitions

Elastically deformable section of coupling element.

The elastically deformable section of the coupling element has a higher elasticity and thus a lower Young's modulus than the other sections of the coupling element, at least in the longitudinal direction of the coupling element (direction perpendicular to the shaft axes).

DETAILED DESCRIPTION OF THE PREFERRED EMBODIMENTS

Figure 1:
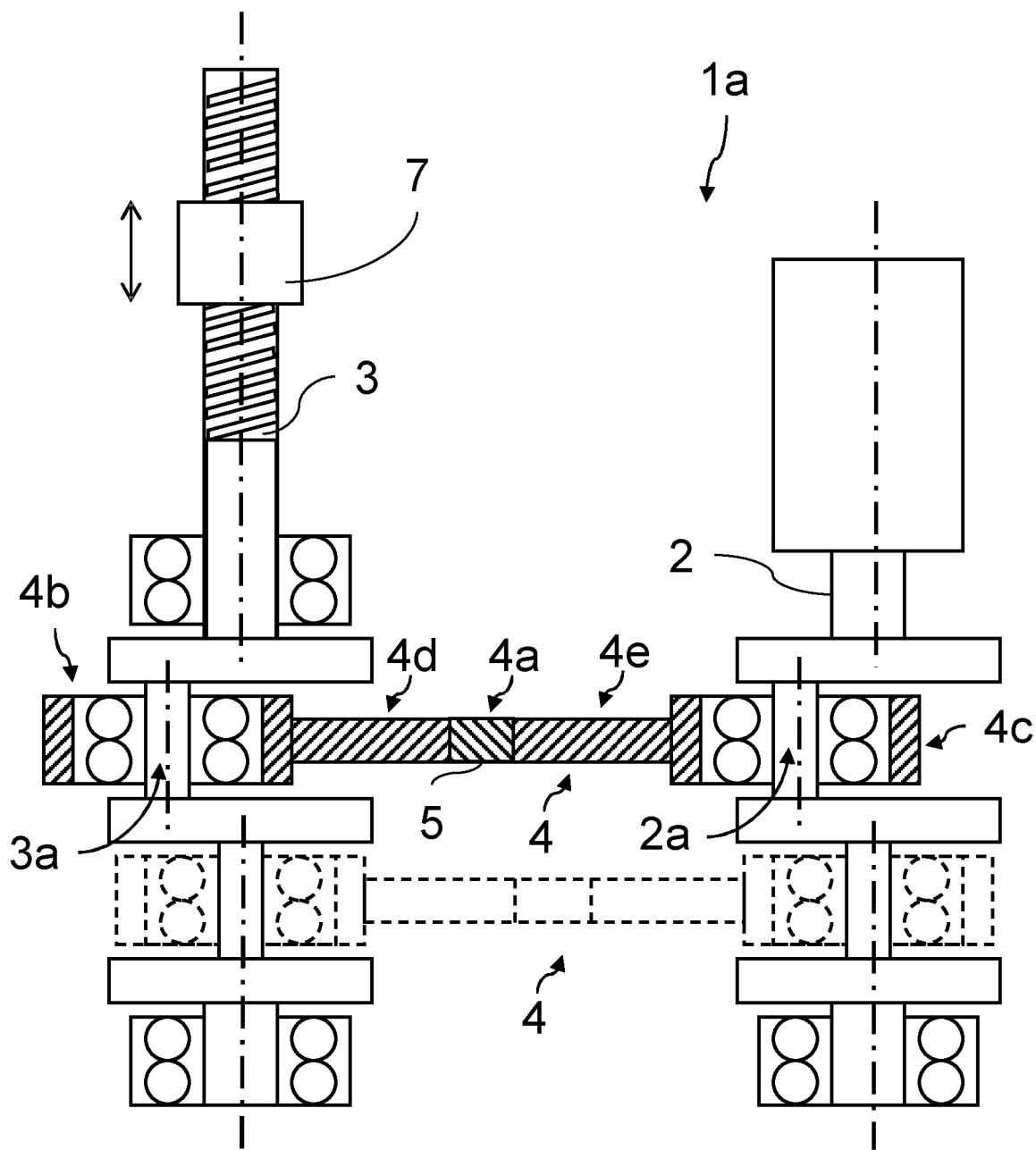
FIG. 1 shows a schematic sectional view of a first embodiment of the drive system according to the invention.

FIG. 1 schematically shows a first embodiment of the drive system. The drive system 1a includes a drive shaft 2 and an output shaft 3 arranged parallel thereto. Both shafts 2, 3 are mounted via rolling bearings. The bearing arrangement and the type of rolling bearing are not specified in more detail here. It goes without saying that various options exist for the bearing arrangement and the choice of rolling bearings to meet the requirements of specific applications. In addition to rolling bearings, the use of plain bearings is also possible.

Furthermore, the drive system 1a includes two coupling elements 4. The number of coupling elements is not limited to two. In particular, the drive system 1a may also include more than two coupling elements 4. In the present embodiment, each coupling element 4 is connected to an eccentric section 2a, 3a of the input and output shafts 2, 3 via a connecting section 4b, 4c. In this case, the connection is preferably made via rolling bearings, with an outer ring of the corresponding rolling bearing being connected to the connecting section 4b, 4c of the coupling element 4 and an inner ring being connected to the eccentric section 2a, 3a of the input or output shaft 2, 3. In addition to other types of connection, plain bearings may be used instead of rolling bearings. The eccentric sections 2a, 3a or the coupling elements 4 are preferably arranged 60° or 90° out of phase with one another with respect to the axes of rotation of the input or output shafts 2, 3.

According to the invention, at least one of the coupling elements 4 includes an elastically deformable section 4a. In a case where the drive system 1a includes more than two coupling elements 4, at least so many coupling elements 4 include the elastically deformable section 4a that the number of coupling elements 4 having the elastically deformable section 4a is one less than the total number of coupling elements 4. The elastically deformable section 4a is preferably arranged exactly or substantially centrally between the connecting sections 4b, 4c of each coupling element 4 or between the eccentric sections 2a, 3a of the input and output shafts 2, 3, respectively. Intermediate sections 4d, 4e of the coupling element 4 connect each connecting section 4b, 4c to the elastically deformable section 4a. The elastically deformable section 4a may be formed as an elastic element 5, for example in the form of an elastomer or a spring. The connecting sections 4b, 4c, the intermediate sections 4d, 4e and the elastic element 5 may be individual parts, each of which may have different materials and which are preferably joined by material bonding to form the coupling element 4. In addition, in one option the connecting sections 4b, 4c and the intermediate sections 4d, 4e may be formed in one piece and consequently also may be made of the same material. Furthermore, the entire coupling element 4 may also be of integral construction. In this case, the elastically deformable section 4a may be characterized by a smaller cross-section than the intermediate sections 4d, 4e or the connecting sections 4b, 4c of the coupling element 4.

In all embodiments of the coupling element 4, the elastically deformable section provides variable spacing of the connecting sections 4b, 4c, thereby compensating for differences in length of the coupling elements 4, deviations in the parallelism of the shaft axes, and generally assembly and manufacturing tolerances of the individual components of the drive system 1a, and preventing jamming of the drive system 1a. Consequently, part of the input power is absorbed by the elastically deformable section 4a due to elastic deformation, which affects the efficiency of the drive system 1a and results in torque variations between the input shaft 2 and the output shaft 3.

Figure 2:
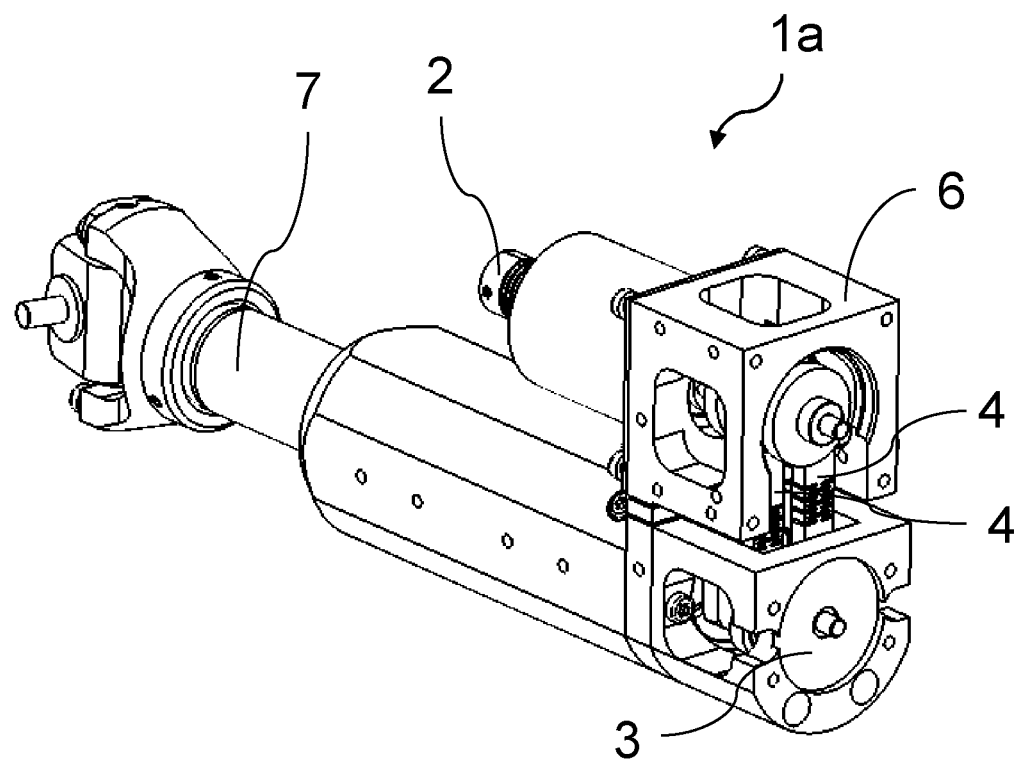
FIG. 2 shows a perspective view of the first embodiment of the drive system.
Figure 3:
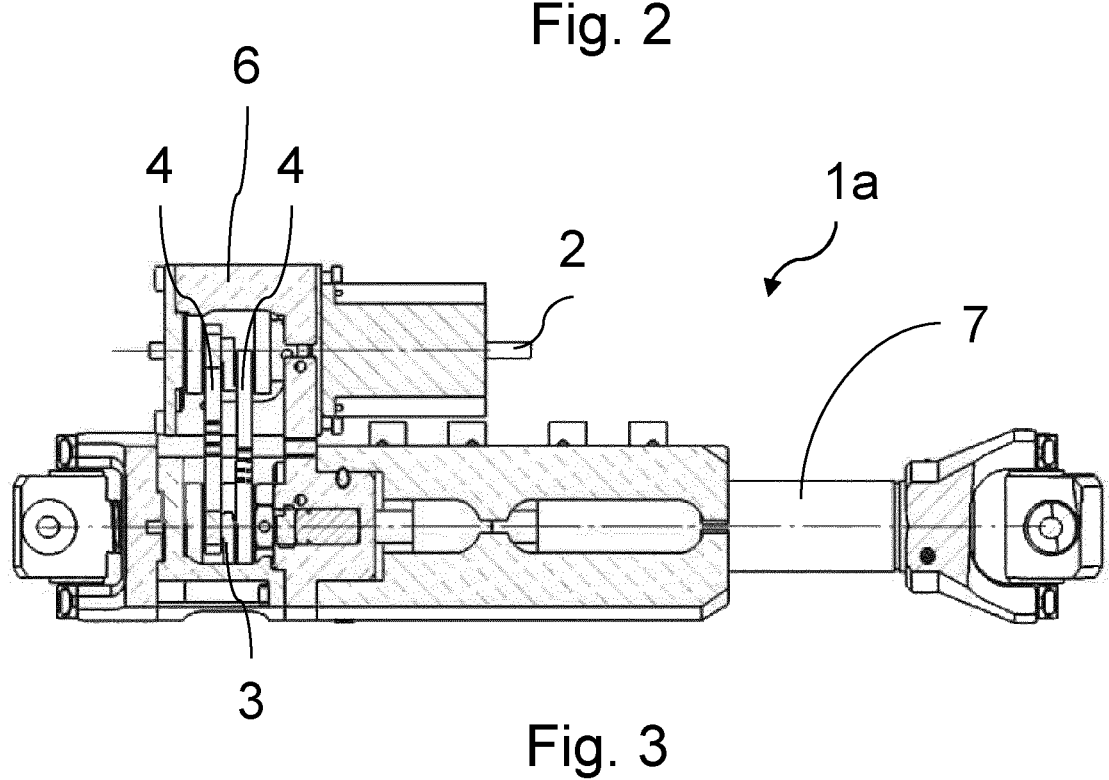
FIG. 3 shows a longitudinal section of the first embodiment of the drive system.

FIGS. 2 and 3 show respectively a perspective view and a longitudinal section of the first embodiment of the drive system 1a as part of a hexapod. In particular, the output shaft 3 is connected to an actuator 7 or leg of the hexapod, which is configured to perform a linear motion based on the rotation of the output shaft 3. Input and output shafts 2, 3 are mounted in a common housing 6, which is preferably also of elastic design. This enables elastic mounting of the shafts 2, 3, which introduces additional flexibility into the system and further reduces the risk of jamming.

In the present application, the drive system 1a is designed for continuous and rapid rotation of the output shaft 3. In order to reliably prevent jamming of the drive system 1a, the elastically deformable section 4a has a suitable absorption capacity, but preferably the efficiency of the drive system 1a is at least 95% and/or the torque variation between the input shaft 2 and the output shaft 3 is not greater than 20%.

Figure 4:
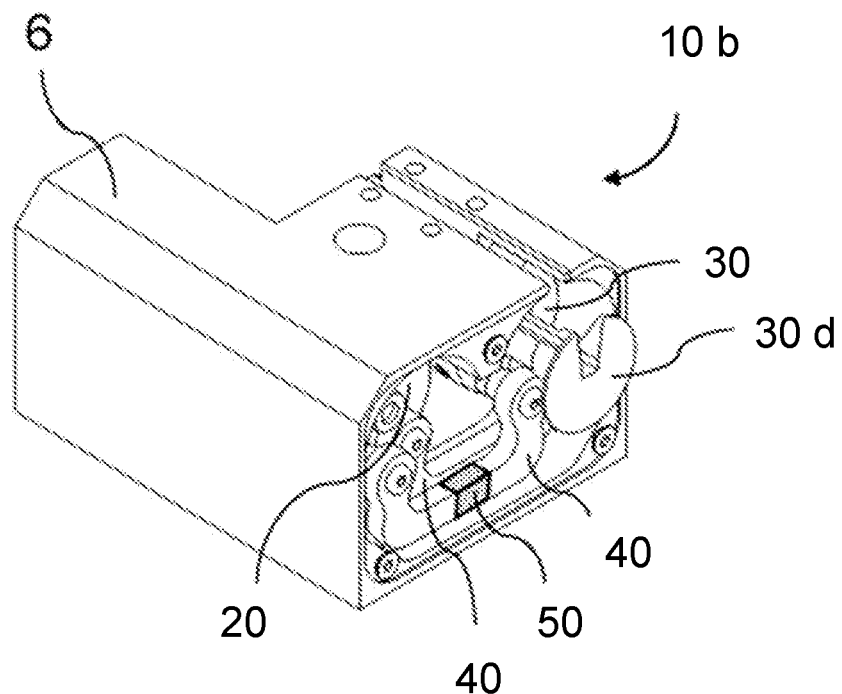
FIG. 4 shows a perspective view of a second embodiment of the drive system according to the invention.
Figure 5:
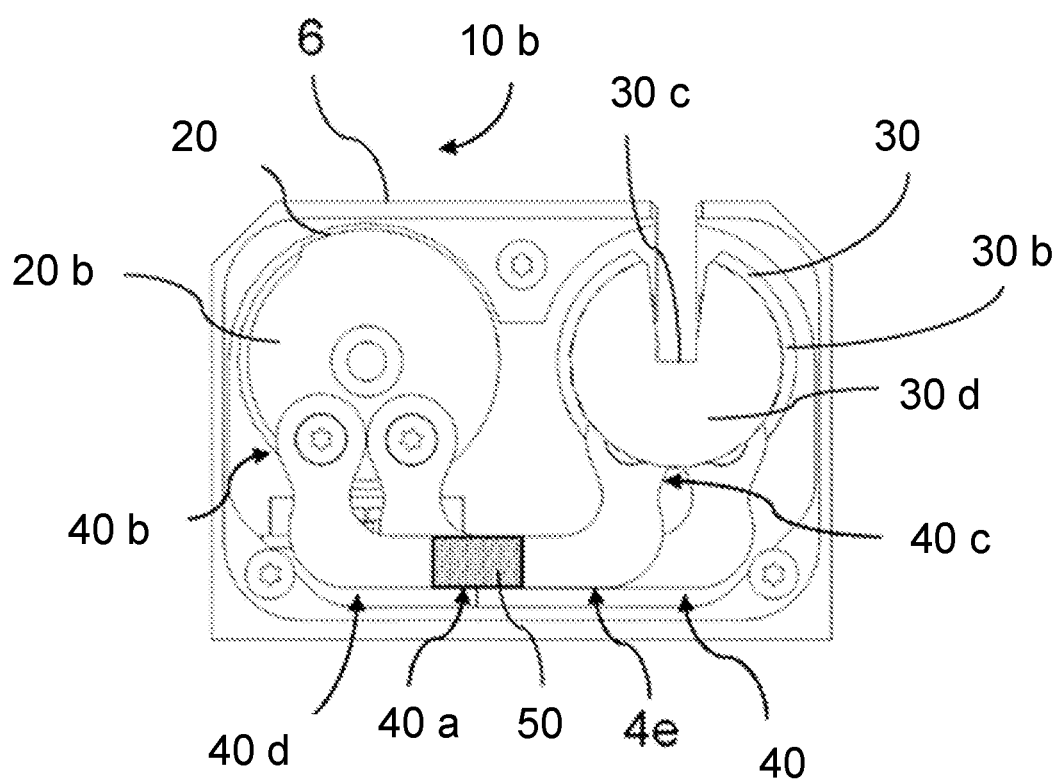
FIG. 5 shows a front view of the second embodiment of the drive system.

FIGS. 4 and 5 show a second embodiment of the drive system 10 b according to the invention. The main difference from the first embodiment is that the connecting sections 40 b, 40 c of the coupling elements 40 are connected to end faces 20 b, 30 b of the input and output shafts 20, 30, the two coupling elements 40 being at different distances from the respective end faces 20 b, 30 b. In particular, the coupling elements 40 are rotatably attached to the end faces 20 b, 30 b of the shafts 20, 30 such that one coupling element 40 is located above the other coupling element 40, with respect to a direction perpendicular to the end faces 20 b, 30 b of the shafts 20, 30. A phase offset of the coupling elements 4 may also be realized in the present embodiment and is preferably 60°.

The various embodiments of the elastically deformable section 40 a as an elastic element 50 made of a specific material or a specific shape or as a section with a reduced cross-section are already described with reference to the first embodiment of the drive system 10 a.

Furthermore, for receiving an optical fiber, the output shaft 30 is provided with a receiving section 30 d, which protrudes from the end face 30 b and projects beyond the coupling elements 40 with respect to a direction perpendicular to the end face 30 b. In the present embodiment, the coupling elements 40 are formed in a U-shape to allow rotation of the output shaft 30 in both directions up to a rotation angle, at which a coupling element 4 is blocked by the receiving section 30 *d*. In particular, in the present embodiment, the rotation of the output shaft 30 is limited to a rotation angle of +/−135° about the rotation axis. The attachment of the coupling elements 4 to the end faces 20 *b*, 30 *b* of the input and output shafts 20, 30 ensures free access to the input and output shafts 20, 30, respectively, along their axis of rotation.

A longitudinal slot 30 *c* is also formed in the output shaft 30 to receive the optical fiber, extending axially into the receiving section 30 *d* and extending radially to the axis of rotation of the output shaft 30. The optical fiber may be clamped onto the rotational axis of the output shaft 30 by a clamping device provided in the longitudinal slot 30 *c* of the output shaft 30 and/or the receiving section 30 *d*.

The second embodiment of the drive system 10 *b* is particularly suitable as a positioning system for an optical fiber, whose polarization angle may be precisely adjusted for coupling light by rotating the fiber about its rotation axis. In order to prevent jamming of the drive system 10 *b*, the elastically deformable section 40 *a* of the drive system 10 *b* also has a suitable absorbing capacity, wherein the efficiency of the drive system 10 *b* is at least 50% and/or the torque variation between the input shaft 20 and the output shaft 30 is not greater than 50%.

LIST OF REFERENCE SIGNS

1 *a*, 10 *b* drive system
2, 20 input shaft
2 *a* eccentric section of the input shaft
2 *b*, 20 *b* end face of input shaft
3, 30 output shaft
3 *a* eccentric section of output shaft
3 *b*, 30 *b* end face of output shaft
3 *c*, 30 *c* longitudinal slot of output shaft
3 *d*, 30 *d* receiving section of output shaft
4, 40 coupling element

The invention claimed is:

1. Drive system comprising:
an input shaft;
an output shaft arranged in parallel to the input shaft;
at least two coupling elements coupled to the input shaft and the output shaft, respectively, and extending in a direction perpendicular to the input shaft and the output shaft,
wherein:
at least one coupling element of the at least two coupling elements has an elastically deformable section,
the elastically deformable section having a different material than an adjacent section of the coupling element, wherein the elastically deformable section is integrated into the coupling element by material bond, or
the elastically deformable section having a different cross section than an adjacent section of the coupling element, wherein an entirety of the coupling element is formed as one piece.

2. Drive system according to claim 1, wherein the elastically deformable section is arranged exactly or substantially centrally between the input shaft and the output shaft.

3. Drive system according to claim 1, wherein the elastically deformable section has an elastic element, formed as a spring or an elastomer.

4. Drive system according to claim 1, wherein each of the input shaft and the output shaft comprises:
one or more eccentric sections, and each coupling element is coupled to a corresponding eccentric section.

5. Drive system according to claim 1, wherein each coupling element is coupled to an end face of the input shaft and/or an end face of the output shaft.

6. Drive system according to claim 1, wherein the coupling elements are arranged on the input shaft and the output shaft so as to be out of phase with one another.

7. Drive system according to claim 1, wherein the input shaft and the output shaft are mounted in a common housing which is elastically deformable.

8. Drive system according to claim 1, wherein the output shaft has a longitudinal slot extending along an axis of output shaft rotation.

9. Drive system according to claim 1, wherein the at least one coupling element is U-shaped.

10. Drive system according to claim 8, wherein the output shaft is adjustable by a rotation angle of +/−135° about the axis of output shaft rotation.

11. Drive system according to claim 1, wherein the coupling elements are arranged on the input shaft and the output shaft so as to be out of phase with one another by 60° or 90°.

12. Drive system according to claim 1, wherein the elastically deformable section is arranged exactly or substantially centrally between the input shaft and the output shaft.

13. Drive system according to claim 12, wherein the elastically deformable section has an elastic element, formed as a spring or an elastomer.

14. Drive system according to claim 13, wherein each of the input shaft and output shaft comprises:
one or more eccentric sections, and each coupling element is coupled to a corresponding eccentric section.

15. Drive system according to claim 14, wherein each coupling element is coupled to an end face of the input shaft and/or an end face of the output shaft.

* * * * *